United States Patent [19]

Matsumaru

[11] 4,285,729

[45] Aug. 25, 1981

[54] DENSE CROWN OPTICAL GLASS

[75] Inventor: Shizuo Matsumaru, Yokohama, Japan

[73] Assignee: Nippon Kogaku K.K., Tokyo, Japan

[21] Appl. No.: 101,227

[22] Filed: Dec. 7, 1979

[30] Foreign Application Priority Data

Dec. 14, 1978 [JP] Japan .................................. 53-153623

[51] Int. Cl.³ ........................... C03C 3/08; C03C 3/10
[52] U.S. Cl. .................................... 106/47 Q; 106/54
[58] Field of Search ................................. 106/54, 47 Q

[56] References Cited

U.S. PATENT DOCUMENTS 3,248,238   4/1966   Faulstich ................................. 106/54
3,964,918   6/1976   Hares et al. ........................ 106/47 Q

*Primary Examiner*—Helen M. McCarthy
*Attorney, Agent, or Firm*—Shapiro and Shapiro

[57] ABSTRACT

Dense crown optical glass comprises, in percent by weight:

| | |
|---|---|
| $SiO_2$ | 20–28 |
| $B_2O_3$ | 24–34 |
| $BaO$ | 17–32 |
| $CaO$ | 5–7 |
| $Al_2O_3$ | 2–6 |
| $La_2O_3$ | 8–19 |

2 Claims, No Drawings

DENSE CROWN OPTICAL GLASS

BACKGROUND OF THE INVENTION

1. Field of the Invention

This invention relates to improvements in dense crown optical glass.

2. Description of the Prior Art

The conventional dense crown optical glass basically comprises a $SiO_2$—$B_2O_3$—$Al_2O_3$—$BaO$ system. Of the dense crown optical glasses, the glass in the range of high refractive index and low dispersion contains a great deal of BaO, and, therefore, has a very poor chemical durability. Along with the advance of optical glass polishing and machining techniques, optical glasses have become often exposed to severe machining conditions, and along with the spread of multi-layer coatings, the presence of a surface corrosion-degeneration layer has become impermissible. Thus, more importance has become attached to the chemical durability of optical glasses than before. To improve this, there is an optical glass having $La_2O_3$ introduced in said system. Such optical glass is disclosed, for example, in U.S. Pat. No. 3,248,238. This glass comprises the following composition in percent by weight:

| | |
|---|---|
| $SiO_2$ | 24–32 |
| $B_2O_3$ | 16–27 |
| BaO | 15–40 |
| BaO + ZnO + MgO + CaO | 38–44 |
| $La_2O_3$ | 3–7 |
| ZnO + CaO + MgO | 0–26 |

However, it cannot be said that this optical glass has a fully improved chemical durability.

SUMMARY OF THE INVENTION

The object of the present invention is to provide dense crown optical glass of which the refractive index $n_d$ is 1.610–1.625, the refractive index $n_e$ is 1.615–1.630, the Abbe number $\nu_d$ is 57–61, and which is excellent in chemical durability. The present invention enhances the chemical durability while maintaining the same degree of refractive index by introducing a great deal of $La_2O_3$, thereby reducing the amount of BaO necessary to obtain the same refractive index and further improving the chemical durability. Also, CaO which imparts to the glass the same degree of refractive index as that of BaO and which enhances the chemical durability of the glass more than BaO is introduced into part of BaO as a requisite component, and $Al_2O_3$ which enhances the chemical durability of the glass is further introduced as a requisite component, thereby further improving the chemical durability.

DESCRIPTION OF THE PREFERRED EMBODIMENTS

The composition of the optical glass according to the present invention is shown below in percent by weight.

| | |
|---|---|
| $SiO_2$ | 20–28 |
| $B_2O_3$ | 24–34 |
| BaO | 17–32 |
| CaO | 5–7 |
| $Al_2O_3$ | 2–6 |
| $La_2O_3$ | 8–19 |

The above composition will hereinafter be described in detail. If $SiO_2$ is less than 20 percent, a sufficient chemical durability will not be provided, and if $SiO_2$ exceeds 28 percent, it will not melt readily, thus prolonging the melting time. If $B_2O_3$ is less than 24 percent, the glass will become unstable for devitrification and if $B_2O_3$ exceeds 34 percent, the chemical durability will be aggravated. If BaO is less than 17 percent, the liquid phase temperature will become higher and if BaO exceeds 32 percent, the chemical durability will be made worse. If CaO is less than 5 percent, a sufficient chemical durability will not be provided and if CaO exceeds 7 percent, the liquid phase temperature will become higher. If $Al_2O_3$ is less than 2 percent, a sufficient chemical durability will not be provided and if $Al_2O_3$ exceeds 6 percent, the liquid phase temperature will become higher. If $La_2O_3$ is less than 8 percent, a sufficient chemical durability will not be provided and if $La_2O_3$ exceeds 19 percent, the liquid phase temperature will become higher. In this case, the sum of CaO and BaO should desirably be equal to or less than 37.4 percent to further enhance the chemical durability, and CaO+BaO should preferably be 22–37.4 percent.

The optical glass according to the present invention may be produced by using, as the raw materials of the various components, corresponding oxides, carbonate, nitrate, etc. and if required, adding thereto a defoaming agent such as arsenious acid, mixing them together at a desired rate to provide a compound raw material, throwing the same into a platinum crucible in an electric furnance heated to 1300°–1400° C., stirring and uniformizing the compound material after it has become molten and clear, casting the same into an iron mold, and then gradually cooling the same.

The composition (percent by weight), refractive indices $n_d$ and $n_e$, and Abbe number $\nu_d$ of an embodiment of the optical glass according to the present invention are shown in Table 1.

Table 2 shows the acid resistivity and water resisting property, which provide the standard of the chemical durability, of a first embodiment of the present invention and the embodiment of aforementioned U.S. Pat. No. 3,248,238 which has the same refractive index $n_d$ as in the first embodiment of the present invention. Table 2 shows the compositions of these two glasses. The acid resistivity shown is the result of maintaining powdered glass having a specific gravity gram of 420 μm–590 μm at 100° C. in nitric acid of 0.01 N for 60 minutes and calculating the rate of amount reduction (percent by weight) from the weight of the sample and its amount of reduction. The water resisting property shown is the result of testing the same glass in pure water in the same manner. Glasses having a smaller rate of amount reduction (percent by weight) are more excellent in chemical durability and it is apparent from Table 2 that the optical glass according to the present invention is excellent.

TABLE 1

| | First Embodiment | Second Embodiment | U.S. Pat. No. 3,248,238 |
|---|---|---|---|
| $SiO_2$ | 26.12 | 27.56 | 24.2 |
| $B_2O_3$ | 25.86 | 24.44 | 26.9 |
| BaO | 30.52 | 31.55 | 40.1 |

TABLE 1-continued

|  | First Embodiment | Second Embodiment | U.S. Pat. No. 3,248,238 |
| --- | --- | --- | --- |
| CaO | 6.67 | 5.66 | — |
| $Al_2O_3$ | 2.81 | 2.30 | 1.9 |
| $La_2O_3$ | 8.02 | 8.49 | 6.0 |
| $n_d$ | 1.6170 | 1.6173 | 1.6170 |
| $n_e$ | 1.6200 | 1.6197 | — |
| $\nu_d$ | 60.0 | 60.7 | 60.7 |

TABLE 2

|  | Chemical Durability | |
| --- | --- | --- |
|  | Acid resistivity | Water resisting property |
| First Embodiment | 1.44% by weight | 0.21% by weight |
| U.S. Pat. No. 3,248,238 | 2.13% by weight | 0.42% by weight |

According to the present invention, as has been described above, dense crown optical glass excellent in chemical durability can be produced industrially stably.

I claim:

1. Dense crown optical glass having excellent chemical durability, a refractive index nd in the range of 1.610–1.625 and an Abbe number $\nu$d in the range of 57–61, consisting essentially of, in percent by weight:

| $SiO_2$ | 26.12 |
| --- | --- |
| $B_2O_3$ | 25.86 |
| BaO | 30.52 |
| CaO | 6.67 |
| $Al_2O_3$ | 2.81 |
| $La_2O_3$ | 8.02. |

2. Dense crown optical glass having excellent chemical durability, a refractive index nd in the range of 1.610–1.625 and an Abbe number $\nu$d in the range of 57–61, consisting essentially of, in percent by weight:

| $SiO_2$ | 27.56 |
| --- | --- |
| $B_2O_3$ | 24.44 |
| BaO | 31.55 |
| CaO | 5.66 |
| $Al_2O_3$ | 2.30 |
| $La_2O_3$ | 8.49. |

* * * * *